April 25, 1933.  W. A. CHRYST  1,905,149
SHOCK ABSORBER VALVE
Filed May 8, 1930    2 Sheets-Sheet 1
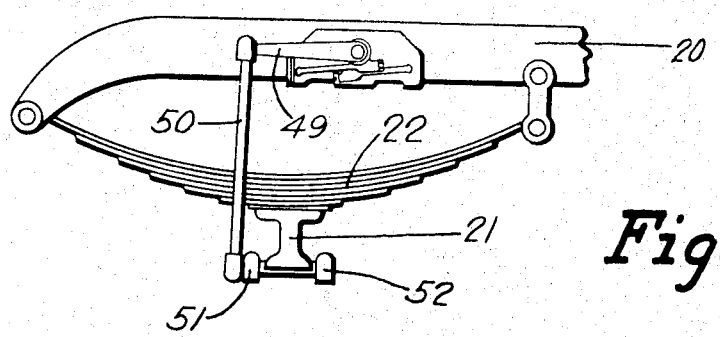
Fig. 1.
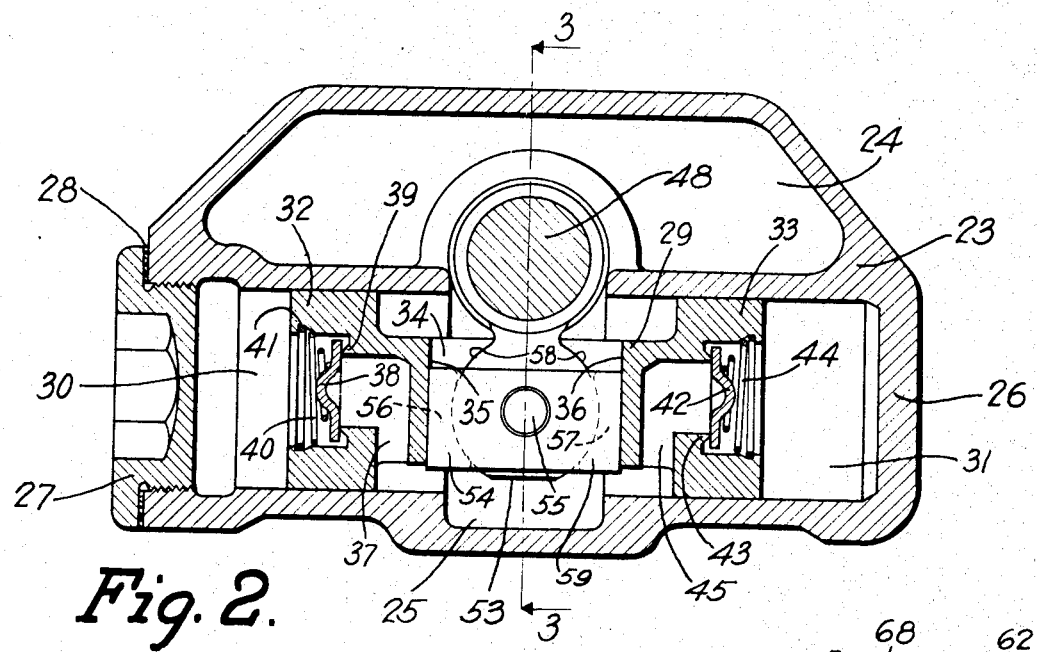
Fig. 2.
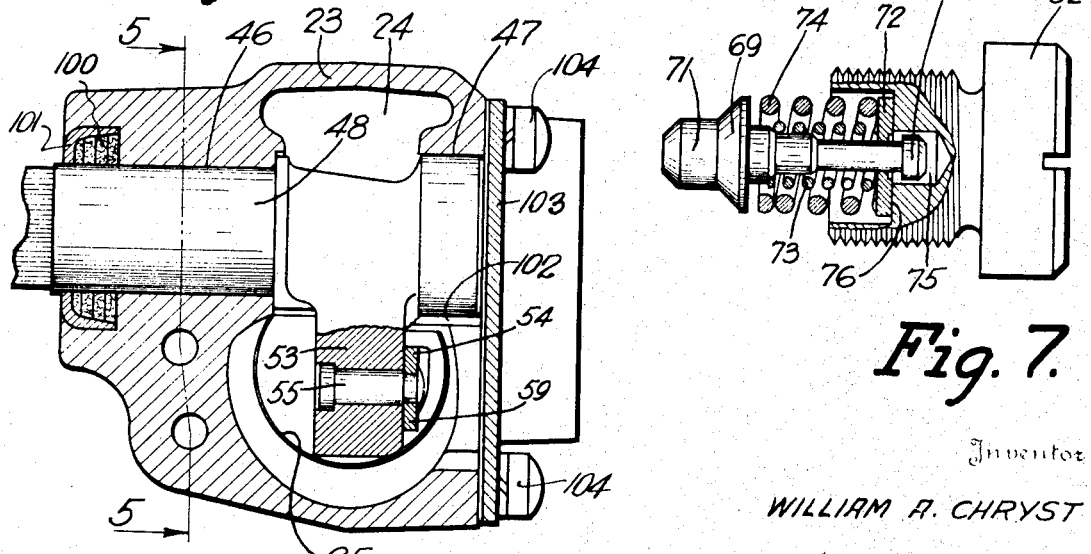
Fig. 3.
Fig. 7.
Inventor
WILLIAM A. CHRYST
By Spencer, Hardman and Fehr
Attorneys April 25, 1933.  W. A. CHRYST  1,905,149
SHOCK ABSORBER VALVE
Filed May 8, 1930  2 Sheets-Sheet 2
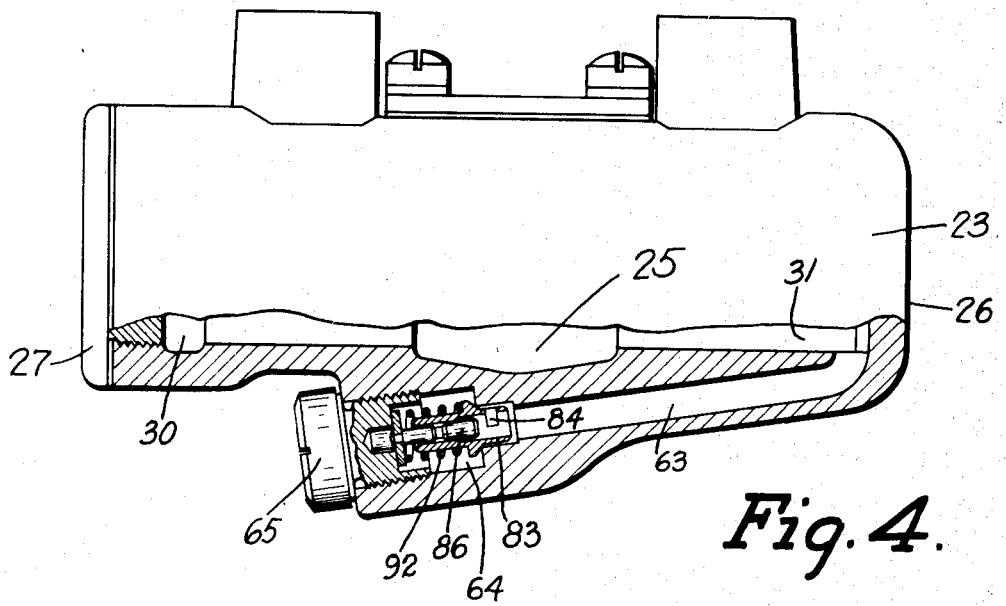
Fig. 4.
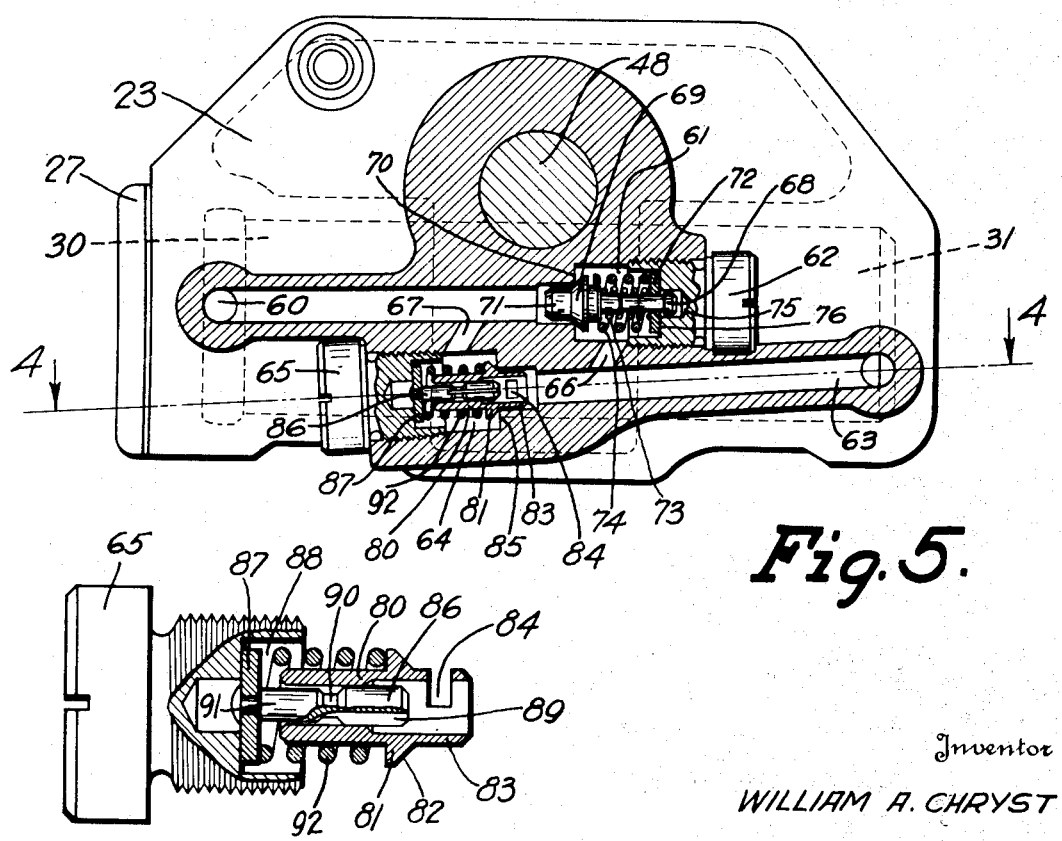
Fig. 5.
Fig. 6.
Inventor
WILLIAM A. CHRYST
By Spencer, Hardman and Fehr
Attorneys Patented Apr. 25, 1933

1,905,149

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER VALVE

Application filed May 8, 1930. Serial No. 450,713.

This invention relates to improvements in pressure relief valves for hydraulic shock absorbers.

It is among the objects of the present invention to provide a hydraulic shock absorber with improved fluid pressure release devices whereby the compression and rebound movements of vehicle springs are more effectively controlled.

Further objects and advantages of the present invention will be apparent from the following description, reference being had to the accompanying drawings wherein a preferred embodiment of one form of the present invention is clearly shown.

In the drawings:

Fig. 1 is a fragmentary view of a portion of a vehicle chassis, a shock absorber embodying the present invention being shown applied thereto. The roadwheels of the vehicle have been omitted for the sake of clearness.

Fig. 2 is a longitudinal sectional view taken through the shock absorber.

Fig. 3 is a transverse section taken along the line 3—3 of Fig. 2.

Fig. 4 is a fragmentary sectional view taken along the line 4—4 of Fig. 5.

Fig. 5 is a fragmentary sectional view taken along the line 5—5 of Fig. 3.

Fig. 6 is an enlarged fragmentary sectional view of the pressure release device for one of the compression chambers.

Fig. 7 is a view similar to Fig. 6 showing the pressure release device for the other compression chamber.

Referring to the drawings, the numeral 20 designates the frame of the vehicle supported upon the vehicle axle 21 by springs 22.

The shock absorber comprises a casing 23 providing a fluid reservoir 24 and a cylinder 25, one end of which is closed by the casing wall 26. The other end of the cylinder is closed by a screw cap 27, provided with a suitable gasket 28 to prevent leaks at this point.

A fluid displacement member 29 within the cylinder 25 forms a compression chamber at each end thereof, one being designated by the numeral 30, the other by the numeral 31. The compression chamber 30 may be termed the "spring compression controlling chamber", while the compression chamber 31 may be termed the "spring rebound controlling chamber". The fluid displacement member 29 or piston, comprises two head portions 32 and 33 respectively. Head portion 32, as will be seen in Fig. 2, forms the compression chamber 30, while head portion 33 forms the compression chamber 31. These two piston head portions are united by web portion 34 which forms one wall of the chamber between the piston head portions 32 and 33, said chamber being bounded at the ends by the two flat walls 35 and 36 respectively. Piston head portion 32 has a passage 37 providing for the transfer of fluid from the fluid reservoir 24 to the compression chamber 30. This fluid flow is established by an intake valve 38 maintained against an annular valve seat 39 in the piston head about the passage 37, by a spring 40, the one end of which is seated in an annular groove 41 formed within the piston head 32. A similar valve 42 is maintained upon a seat 43 by the spring 44, said valve controlling the transfer of fluid through the passage 45 in the piston head 33.

Bearings 46 and 47, provided in the casing, rotatably support the rocker shaft 48, one end of which extends outside the casing 23 and has the shock absorber operating arm 49 secured thereto. The free end of this arm is swivelly secured to the link 50, the other end of said link being swivelly attached to a bracket 51 which is anchored to the axle 21 by the clamping member 52.

The rocker shaft 48 has a rocker lever 53 extending therefrom into the chamber provided between the piston heads 32 and 33. A saddle-shaped wearpiece 54 is supported upon the rocker lever 53 by a pin 55, this saddle-shaped wearpiece comprising two side members 56 and 57, having curved inner faces which engage the circular edge 58 of the lever 53, the outer faces of said side members are flat and engage the flat walls 35 and 36 respectively of the piston heads 32 and 33 respectively. The two side members 56 and 57 are joined by a web portion 59. It will be seen that this saddle-shaped wearpiece provides large surface contact between the piston operating lever 58 and the pistons 32 and 33 respectively so that wear between these moving parts is reduced to a substantial minimum.

Referring particularly to Figs. 4 and 5, it will be seen that compression chamber 30 has a channel 60 leading therefrom, said channel having an enlarged chamber 61 provided at its open end. This enlarged chamber is closed by a screw plug 62. Another channel 63 leads from the compression chamber 31, this channel also being provided with an enlarged chamber 64 at its open end, the open end of the enlarged chamber 64 being closed by a screw plug 65. A duct 66 provides communication between the enlarged chamber 61 of the channel 60 and the channel 63 and a similar duct 67 provides communication between the channel 60 and the enlarged chamber 64 of the channel 63.

A fluid pressure release device is provided in the chamber 61, this device comprising a valve stem 68 having a frustro-conically shaped head 69, the tapering surface of which engages the annular shoulder 70 formed between the channel 60 and its enlarged chamber 61. A pilot 71 extends from the head portion 69 of the valve into the channel 60, this pilot 71 being of lesser diameter than said channel 60 and thus providing an annular orifice between the inner wall of the channel 60 and the pilot. A washer 72 is provided on the stem 68. Two springs surround the stem 68 and are interposed between the washer 72 and the head 69 of the valve, one of these springs 73, normally engages both washer and head of the valve and is of a lesser tension than the spring 74 which is of lesser length than the normal distance between the washer 72 and head 69. As is clearly shown in Fig. 7, stem 68 extends into a recess 75 provided in the screw plug 62, while the washer 72 is normally urged upon a shoulder 76 in the screw plug 62 by the spring 73.

The chamber 64 of the channel 63 also contains a fluid pressure release device. This device as shown in Figs. 5 and 6, comprises a tubular, unbalanced valve 80, having a head portion 81 provided with a tapering surface 82 from which extends a pilot 83. A slot 84 is provided in the one side of the tubular pilot 83.

The sloping surface 82 of the valve head engages the annular valve seat provided by the shoulder 85, the pilot 83 extending into the channel 63 and being of lesser transverse dimension than said channel. Tubular valve 80 is slidably supported on the stem 86 which is carried on the washer 87, seated in the bottom of the recess 88 of the screw plug 65. The valve stem 86 has a longitudinal channel 89 extending from its outer or free end to an annular groove 90 which is provided between the larger portion of the valve stem 86 which slidably supports the tubular valve 80 and the smaller diameter portion 91 of said valve stem which is secured to the washer 87. A spring 92 interposed between the head 81 of the tubular valve and the washer 87 normally urges the valve head 81 into engagement with the annular valve seat.

The operating of the device is as follows:
When the springs 22 are moved through their compression stroke in response to the roadwheels of the vehicle striking an obstruction in the roadway, link 50 will move the shock absorber operating arm 49 in a clockwise direction, causing the rocker shaft 48 and its lever 53 to move the fluid displacement member 34 toward the left as regards Fig. 2. In this instance piston head portion 33 is moving so that the capacity of its cylinder chamber 31 is being increased, thus fluid will flow from the fluid reservoir 25 through the passage 45 against the valve 42, opening said valve and permitting fluid to flow into the cylinder chamber 31 for purposes of replenishing any fluid losses in said chamber due to leaks past the piston or any other part of the device.

As piston 32 travels toward the left, pressure will be exerted upon the fluid within the spring compression controlling chamber 30 causing the fluid to flow into the channel 60. The fluid pressure will be directed through duct 67 into the chamber 64, this fluid pressure assisting spring 92 in maintaining the valve 80 upon its seat. Fluid pressure from channel 60 will also be directed against the valve 69 and its pilot 71, said pressure, when sufficient, overcoming the effect of spring 73 and moving the valve head 69 from engagement with its valve seat and into engagement with spring 74. Thus a fluid flow is established through the orifice provided between the pilot 71 and inner wall of channel 60, restricting the flow of fluid from said channel to the valve chamber 61, whence the fluid is directed through duct 66, channel 63 into the spring rebound controlling chamber 31. If the obstruction met by the roadwheels is comparatively large, the compression movement of springs 22 will be through a greater range and thus a greater pressure will be exerted upon the fluid in the fluid pressure controlling chamber 30, said pressure, if sufficient, urging the valve 69 against the effect of the spring 74, thus the pilot 71 is moved out of the channel 60, eliminating the orifice between the pilot and channel and thus establishing a greater flow from the channel 60 through duct 66 and passage 63 into the chamber 31 to compensate for the excessive pressure within the spring compression controlling chamber 30. The restriction to the flow of fluid from the spring compression controlling chamber 30 into the spring rebound controlling chamber 31 will resist the movement of the piston head portion 32 toward the left as regards Fig. 2 and thus the spring compression movement is likewise resisted.

As soon as the limit of spring compression caused by striking the particular bump has been reached, the springs will have a tendency to return to normal load position with a sudden, rebounding movement which, if not controlled, will result in undesirable shocks and jolts being transmitted to the frame of the vehicle. The present device controls the return movement of the springs so that as said springs begin to move toward the normal load position, link 50 will move the shock absorber operating arm 49 counter-clockwise, which rotates rocker shaft 48 and its lever 53 in a similar direction. Now the piston head portions 32 and 33 are being moved toward the right as regards Fig. 2 and pressure is being exerted upon the fluid within the spring rebound controlling chamber 31, forcing the fluid from said chamber into the channel 63. Fluid pressure is directed through duct 66 upon the valve head 69, assisting the spring 73 in maintaining the valve head 69 upon its seat. Fluid pressure is now directed upon the pressure release device in the channel 63. An initially restricted fluid flow will take place from the channel 63 through the tubular valve 80 and the longitudinal channel 89 in the valve stem 86, into the annular groove 90, which provides an expansion chamber within the confines of the tubular valve 80 and then from this chamber through the space between the valve stem portion 91 and the tubular valve into the valve chamber 64, thence through duct 67 and channel 60 into the chamber 30, the capacity of which is being increased by the movement of the piston head 32 toward the right. The expansion chamber provided by the groove 90 in the valve stem 86 provides for quiet operation of the valve. Usually fluid when passing through a passage at high pressure will have a tendency to hiss; however, by providing groove 90, the fluid under pressure flowing through the longitudinal channel 89 in the valve stem 86 will enter the chamber formed by groove 90. The fluid under pressure expanding at this point and flowing through the space provided between the reduced portion 91 of the valve stem and the interior of the tubular valve 80 will enter the recess 88 in the screw plug 65 in the form of an annular sheet and at lesser pressure than the pressure of the fluid passing through the channel 89 whereby hissing or whistling of the fluid flow is substantially eliminated.

If the pressure within the channel 63 cannot be properly released by the fluid passage through the channel 89 in the valve stem 86, the pressure will move the unbalanced tubular valve 80 against the effect of its spring 92 so that the valve head 81 will move away from its seat and thus there is established a flow of fluid from the channel 63 through the tubular pilot portion 83 of the tubular valve 80, slot 84 past the valve head 81 and its seat into the valve chamber 64 and thence through duct 67 and channel 60 into the chamber 30. The slot 84 being on one side of the tubular pilot portion 83 of the valve 80 will tend to urge the valve toward one side of the port, presented by the channel 63, thereby substantially eliminating chattering of the valve as the fluid passes through it on its way to the chamber 30.

In Fig. 3 a packing 100 provided with a packing gland 101 is fitted into a recess in the casing 23 about the shaft 48, substantially preventing fluid leaks at this point. The rear end of the shock absorber is open as at 102 so that the shock absorber operating shaft 48 and its lever 53 may be properly inserted into the casing. This opening 102 is sealed and covered by the gasketed cover plate 103 secured to the casing by screws 104.

The present device provides a shock absorber of compact and sturdy structure, capable of controlling both compression and rebounding movements of vehicle springs.

While the form of embodiment of the present invention as herein disclosed, constitutes a preferred form, it is to be understood that other forms might be adopted, all coming within the scope of the claims which follow.

What is claimed is as follows:

1. A pressure release valve for the discharge port of a shock absorber comprising, in combination, a tubular valve member having an outwardly extending flange adjacent its one end and a hole in the side of the wall thereof between the flange and its adjacent end; a valve stem slidably supporting said tubular valve, said stem having an annular groove substantially intermediate its ends and dividing the stem into two portions, the one being of lesser diameter than the other, one of said stem portions being provided with a longitudinal slot leading from the annular groove to the end of the stem; a washer secured to the other end of the stem and a spring about the stem, interposed between the washer and flange of the tubular valve.

2. A pressure release valve for the discharge port of a hydraulic shock absorber comprising, in combination, a tubular valve having one end adapted to fit slidably into the port of the shock absorber, said end having an opening in its side normally within the confines of the port walls; a flange on the tubular valve adjacent the end thereof adapted to extend into the port; a valve stem having an annular groove dividing the stem into two portions, one of which is greater in diameter than the other and slidably fits into and supports the tubular valve, this stem portion having a longitudinal slot leading from the annular groove to the end of the stem, a washer attached to the smaller diameter end of the stem; and a coil spring interposed between the flange of the valve and washer.

3. A pressure release valve for controlling the flow of fluid through a port in a shock absorber comprising, in combination, a tubular valve having an annular flange adapted to engage the peripheral edge of the port; a valve stem slidably supporting said valve, said stem having two portions of different transverse dimensions separated by an annular groove, the larger diameter portion of the stem slidably fitting into the valve and having a longitudinal passage; a disc secured to the smaller diameter end of the stem; and a spring about the stem between the valve and the disc.

4. A pressure release valve for controlling the flow of fluid through a port in a shock absorber comprising, in combination, a valve stem having two portions of different diameters separated by an annular groove, the larger diameter stem portion having a longitudinal groove extending from the end of the stem to the annular groove; a disc secured to the smaller diameter end of the stem; a valve having a tubular stem slidably fitting over the larger diameter part of the stem and extending over the annular groove and partly over the smaller diameter part of the stem; an outwardly extending, annular flange on the outer end of the tubular stem of the valve; and a coil spring interposed between the disc and flange of the valve.

5. A pressure release valve for a hydraulic shock absorber having a duct leading from its fluid compression chamber, said duct providing a valve-seat, comprising in combination, a stationary valve pin having two portions of different diameters separated by an annular groove; a tubular valve slidably carried upon said valve stem, one end of the valve extending into said duct and having an opening at one side normally within the confines of said duct; an annular flange on said valve adapted to engage the valve-seat to limit the movement of the valve into the duct; and a longitudinal groove in the larger diameter of the valve pin providing communication between the duct and the annular groove in said valve stem.

6. A pressure release valve for controlling the flow of fluid through a port in a shock absorber comprising, a stationary valve stem having two portions of different diameters, the larger one having a channel extending throughout its length; a tubular valve slidably supported upon said stem, one end of the tubular valve extending into the port and having a side opening normally confined within said port, a flange on the valve engaging the peripheral edge of the port to limit the entry of the valve into said port; and a fluid expansion chamber within the tubular valve, formed by an annular groove which separates the two diameter portions of the valve-pin.

In testimony whereof I hereto affix my signature.

WILLIAM A. CHRYST.